Aug. 4, 1959 P. E. STERNER 2,898,520

ELECTRIC CIRCUIT ASSEMBLY

Filed Feb. 17, 1956

INVENTOR.
Philip E Sterner
BY
Ralph Hamman 2,898,520

ELECTRIC CIRCUIT ASSEMBLY

Philip E. Sterner, Erie, Pa., assignor to Erie Resistor Corporation, Erie, Pa., a corporation of Pennsylvania Application February 17, 1956, Serial No. 566,254

5 Claims. (Cl. 317—101)

This invention is a multiple element circuit assembly having sheet metal component holding clips with integral plug in prongs which are also adapted for soldering to printed wiring. In a preferred form, the assembly is carried on a strip of insulating material with the individual components side by side and crosswise of the strip and with the prongs projecting from one edge of the strip. The prongs are of sheet metal formed to a half-round section so as to hug the inner periphery of the prong receiving openings. In the case of printed wiring where there are conducting surfaces around the prong receiving openings, the half-round section brings the prongs close to the conducting surfaces so the solder bridging distance between the prongs and surfaces is reduced.

Figure 1:
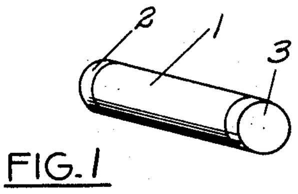
Figure 2:
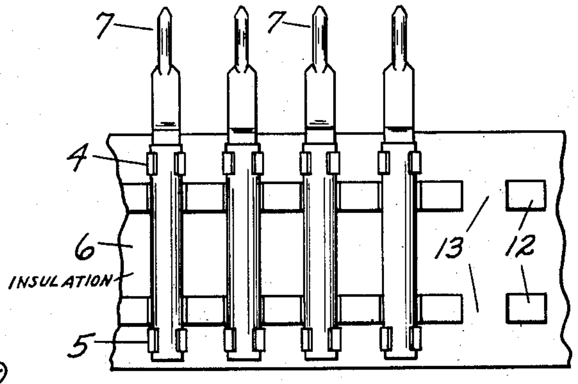
Figure 3:
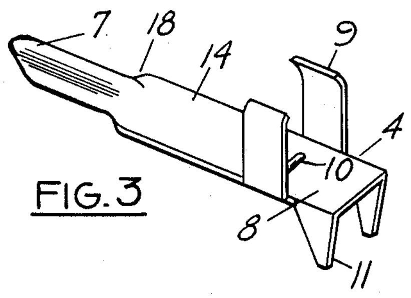
Figure 4:
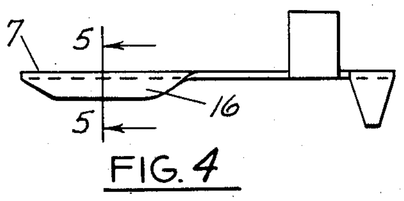
Figure 7:
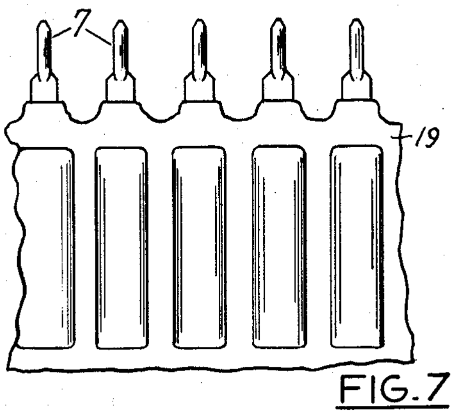
Figures 5, 6, 6A, 8:
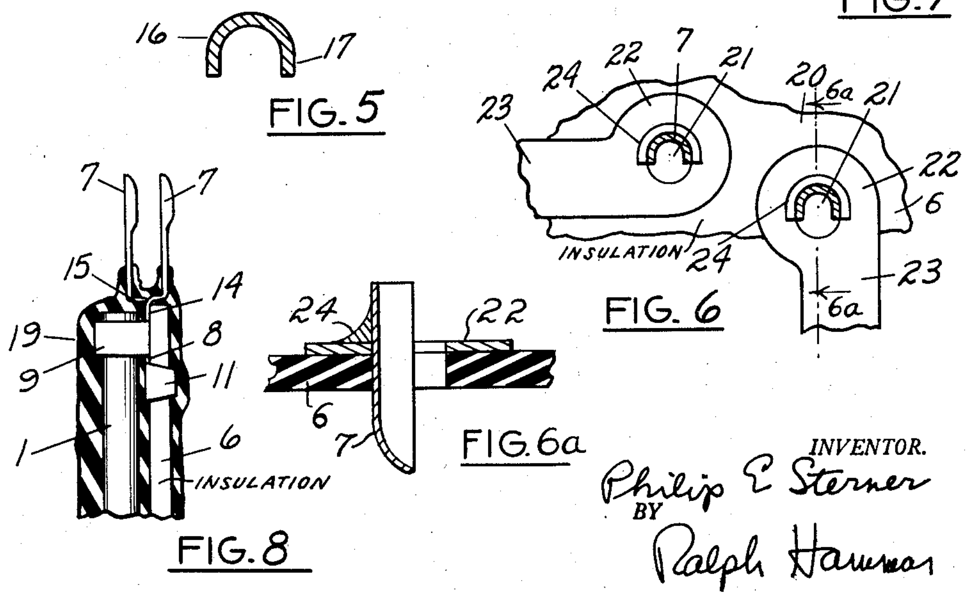

In the drawing, Fig. 1 is a view of a pin-like component, Fig. 2 is a top plan view of a partially completed circuit assembly consisting of a panel and a plurality of components, Fig. 3 is a perspective of one of the clips before assembly, Fig. 4 is a side view of Fig. 3, Fig. 5 is a section on line 5—5 of Fig. 4, Fig. 6 is an enlarged view of a soldered connection between one of the prongs and a printed wiring board, Fig. 6*a* is a section on line 6*a*—6*a* of Fig. 6, Fig. 7 is a plan view of a completed circuit assembly, and Fig. 8 is an end view, partly broken away.

The circuit assembly uses pin-like components having cylindrical bodies 1 with metallic end surfaces 2 and 3. If the component is a resistor, the body may be of molded resistance material and the terminal surfaces 2 and 3 may be sprayed on metal. If the component is a capacitor, the body may be of tubular ceramic and the terminal portions 2 and 3 can be extensions of the electrode coatings on the inner and outer surfaces of the ceramic tube. These are examples of typical pin-like components. It will be noted that no leads are attached to the terminal surfaces 2 so that these are not the conventional components used in the electronic industry where there always is some form of lead attached to the terminal surfaces.

The components are mounted in aligned pairs of clips 4 and 5 respectively adjacent opposite edges of a strip 6 of insulating material. The clips 4 differ from the clips 5 in that they have integral plug-in prongs 7. Each of the clips has a base 8 with upstanding arms 9 forming a clip. Between the arms is an upstanding projection in the form of an indentation on the under side of the base which cooperates with the terminal portion 2 or 3 of the component to keep the body of the component elevated above the base of the clip. At one end of the base there are downwardly extending arms 11 which extend through adjacent openings 12 in the panel strip 6 and are clinched around the intervening section 13. When assembled, the clips are in alignment with the sections 13 in the panel strip. The construction so far described is the same in both clips 4 and 5.

In the clips 4, at the end of the base 8 opposite the fastening arms 11, there is an extended portion 14 which, as shown in Fig. 8, extends to the edge of the panel strip 6 and is there joined by an angular section 15 to the prong 7. Before assembly, the portions of the clips 14 are flat and in line with the prongs 7. After assembly, the portions 14 are formed into angular sections 15 to extend alternately in opposite directions so that adjacent prongs 7 are not only spaced along the edge of the panel strip, but they are also spaced on opposite sides of the panel strip as shown in Fig. 8. The spacing on opposite sides of the thickness of the panel strip provides lateral stability which is desirable in automatic assembly. From one aspect the staggered prongs 7 provide supporting legs by which the completed assembly may be supported in an upright position on a flat surface. The offset portions 15 also impart rigidity so that the prongs 7 are more accurately spaced and are less likely to become bent out of proper position, particularly after the application of the insulating case 19.

As shown more clearly in Figs. 4 and 5, the prongs 7 have at opposite edges wings 16 which as shown in Fig. 5 are formed to a half-round cross section. The half-round section terminates in straight sections 17 which are tangent to the diameter of the half-round section. These straight sections 17 assist in providing a snug fit when the prongs are plugged into a circular hole. The wings 16 are formed from the material forming the extension 14 of the base of the clip and accordingly there is inherently provided a shoulder 18 at the inner end of the prong 7. The shoulder 18 provides a stop which limits the depth of insertion of the prongs. The shoulder 18 also provides an outer limit for an insulating coating 19 which is applied by dipping or molding over the entire finished circuit component. If the insulating coating 19 extended over the prongs 7, an electrical connection could not be made to the prongs. Likewise if there were no shoulder limiting the depth of insertion, it might be possible for the prongs to be inserted too deeply, in which case the insulating coating might prevent the making of the desired electrical connection.

It is expected that the panel strip 6 will carry the necessary wiring to make interconnections between circuit components. Accordingly, when the circuit components are assembled to the pairs of clips, all of the internal circuit connections will be made by the wiring on the panel strip and the external connections connecting the circuit assembly into a complete circuit will be made through the prongs 7. If the circuit assembly is to be removable, the prongs 7 will be plugged into socket contacts. However in many cases, it is desirable that the circuit assembly be permanently connected into an electric circuit. Commonly there will be a printed wiring board 20 having a series of staggered openings 21, each surrounded by a conducting surface 22 integral with a conductor 23. As is evident from Fig. 6, the prongs 7 hug the inner periphery of the openings 21. The straight sections 17 at opposite edges of the prongs tend to dig into the sides of the openings 21 and make a tight fit. Because the prongs hug the inner periphery of the openings 21, they are closely adjacent the conductive coatings 22 surrounding the openings 21 and a soldered connection between the prongs 7 and the conductive coatings 22 may be readily made by solder fillets 24. If the prongs 7 extended diametrically across the openings 21, the bridging distance for the solder would be substantial and the difficulty of making soldered connections would be increased, particularly in automatic or dip soldering methods. However, when the prongs 7 are closely adjacent the conductive coatings 22, the soldering can be very easily made because the bridging distance between the coatings 22 and the prongs 7 is negligible.

What is claimed as new is:

1. An electric circuit assembly comprising a strip of insulating material, a row of electric circuit components extending crosswise of the strip and arranged side by side along the length of the strip, said components having terminal surfaces at opposite ends, aligned pairs of sheet metal clips attached to the strip for receiving the respective components, the clips along one edge of the strip having a base overlying one surface of the strip and an extended portion projecting beyond said one edge of the strip in line with the associated component, said extended portion having an angular section offset from the base at said one edge of the strip and extending transverse to said one surface of the strip opposite the end of the associated component, a prong section extending in continuation of the offset end of the angular section and transverse thereto and generally parallel to said one surface of the strip, the outer end of the prong section having sides formed to a half-round section of diameter substantially smaller than the width of the inner end of the prong section to provide a shoulder limiting the penetration of the prongs.

2. An electric circuit assembly comprising a strip of insulating material, a row of electric circuit components extending crosswise of the strip and arranged side by side along the length of the strip, said components having terminal surfaces at opposite ends, aligned pairs of sheet metal clips attached to the strip for receiving the respective components, the clips along one edge of the strip having a base overlying one surface of the strip and an extended portion projecting beyond said one edge of the strip in line with the associated component, said extended portion having an angular section offset from the base at said one end of the strip and extending transverse to said one surface of the strip, a prong section extending beyond the edge of the strip in continuation of but transverse to the offset angular section, the outer end of the prong section being adapted to serve as a plug-in element, at least one of the prongs having its angular offset section overlying the edge of the strip whereby the edge of the strip absorbs plug-in forces.

3. An electric circuit assembly comprising a strip of insulating material, a row of electric circuit components extending crosswise of the strip and arranged side by side along the length of the strip, said components having terminal surfaces at opposite ends, aligned pairs of sheet metal clips attached to the strip for receiving the respective components, the clips along one edge of the strip having a base overlying one surface of the strip and an extended portion projecting beyond said one edge of the strip in line with the associated component, said extended portion having an angular section offset from the base at said one edge of the strip and extending transverse to said one surface of the strip opposite the end of the associated component, a prong section extending in continuation of the offset end of the angular section and transverse thereto and generally parallel to said one surface of the strip, and an insulating case embedding the strip, components and angular sections but not the prongs whereby the ends of the components assist in resisting the plug-in forces.

4. An electric circuit assembly comprising a strip of insulating material, a row of electric circuit components extending crosswise of the strip and arranged side by side along the length of the strip, said components having terminal surfaces at opposite ends, aligned pairs of sheet metal clips attached to the strip for receiving the respective components, the clips along one edge of the strip having a base overlying one surface of the strip and an extended portion projecting beyond said one edge of the strip in line with the associated component, said extended portions having angular sections offset from the base at one edge of the strip, alternate of the angular sections overlying the edge of the strip and intermediate of the angular section being opposite the end of the associated component, plug-in prong sections extending in continuation of the offset end of the angular sections and transverse thereto, and an insulating case embedding the strip, components and angular sections but not the prongs.

5. An electric circuit assembly comprising a strip of insulating material, a row of electric circuit components extending crosswise of the strip and arranged side by side along the length of the strip, said components having terminal surfaces at opposite ends, aligned pairs of sheet metal clips attached to one surface of the strip for receiving the respective components, the clips along one edge of the strip having an extended portion projecting beyond said one edge of the strip, said extended portion having an angular section offset from and extending transverse to said one surface of the strip, a prong section extending beyond the edge of the strip in continuation of but transverse to the offset angular section, the outer end of the prong section being adapted to serve as a plug-in element.

References Cited in the file of this patent

UNITED STATES PATENTS

| | | |
|---|---|---|
| 1,729,492 | Sauer | Sept. 24, 1929 |
| 2,450,001 | Humphries | Sept. 28, 1948 |
| 2,474,988 | Sargrove | July 5, 1949 |
| 2,566,666 | Khouri | Sept. 4, 1951 |
| 2,631,184 | Sampson | Mar. 10, 1953 |
| 2,707,272 | Blitz | Apr. 26, 1955 |

FOREIGN PATENTS

| | | |
|---|---|---|
| 592,686 | Great Britain | Sept. 25, 1947 |

OTHER REFERENCES

Erie Electronic Design, December 1955, pages 32, 33.